United States Patent
St. Clair

(10) Patent No.: US 6,424,894 B2
(45) Date of Patent: Jul. 23, 2002

(54) METHOD FOR LIMITING ENDSTOP COLLISIONS IN SEMI-ACTIVE SEAT SUSPENSION SYSTEMS

(75) Inventor: Kenneth A. St. Clair, Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/847,230

(22) Filed: May 2, 2001

Related U.S. Application Data

(60) Provisional application No. 60/200,865, filed on May 2, 2000.

(51) Int. Cl.[7] .............................................. G06F 17/00
(52) U.S. Cl. ............................ 701/37; 701/318; 701/49
(58) Field of Search ............................... 701/37, 38, 39, 701/49; 297/284.1, 284.7, 284.8; 248/550, 560, 562, 566; 280/5.5, 5.515

(56) References Cited

U.S. PATENT DOCUMENTS

| | | | |
|---|---|---|---|
| 4,264,050 A | * 4/1981 | Wahls | 248/550 |
| 4,821,849 A | 4/1989 | Miller | |
| 5,276,622 A | 1/1994 | Miller et al. | |
| 5,276,623 A | 1/1994 | Wolfe | |
| 5,908,456 A | * 6/1999 | Wahlers | 701/37 |
| 6,049,746 A | * 4/2000 | Southward et al. | 701/37 |
| 6,059,253 A | * 5/2000 | Koutsky et al. | 248/550 |
| 6,070,681 A | * 6/2000 | Catanzarite et al. | 180/89.15 |
| 6,152,531 A | * 11/2000 | Deceuninck | 297/284.4 |

* cited by examiner

Primary Examiner—Richard M. Camby
(74) Attorney, Agent, or Firm—Michael M. Gnibus

(57) ABSTRACT

A method for limiting endstop collisions when non-typical inputs are experienced and also when the seat is leveled at a position above or below the normal leveling zone limits. According to the method of the invention a temporary or transient control method referred to as rebound control method causes a large damping force to be applied by the seat suspension system in response to non-typically large inputs. The large damping force is applied until a duration timer timesout. Also according to the invention, a level control algorithm provides additional damping when the seat is leveled outside the normal leveling zone. The degree of additional damping provided is a function of the distance the seat exceeds the normal leveling zone.

26 Claims, 6 Drawing Sheets

METHOD FOR LIMITING ENDSTOP COLLISIONS IN SEMI-ACTIVE SEAT SUSPENSION SYSTEMS

CROSS REFERENCE

This application claims the benefit of Provisional Application Ser. No. 60/200,865 filed May 2, 2000.

FIELD OF THE INVENTION

The invention generally relates to a method for limiting endstop collisions in semi-active seat suspension systems, and more particularly the invention relates to a method for limiting endstop collisions by adjusting the seat damping gain when either the system exceeds an endstop detection threshold or the seat is leveled outside of a normal leveling limits.

BACKGROUND OF THE INVENTION

In semi-active control systems, such as semi-active seat suspensions for example, the seat displacement control force provided to the system by a damper is continually adjusted in response to system inputs to provide isolation of high frequency low amplitude disturbances and to also improve performance of the seat suspension and comfort to the rider by limiting endstop collisions. An end stop collision occurs when the mechanical system in which the damper is connected hits the end stop, for example the maximum mechanical limits of the extension and/or rebound strokes when a sufficient transient load is encountered. If the system velocity is high enough when the end stop collision occurs, a very rapid impact results. The bottoming and topping out at an end stop condition imparts unwanted stresses to the mechanical components in the system and such collisions can be an annoyance to the driver. More significantly, when a driver or other seat occupant experiences endstop collisions, such collisions can effect the physical health of the seat occupant.

Prior art semi-active control systems include a control routine that serves to provide a damping force that is proportional to the relative velocity of the seat or of another component of the seat suspension system. U.S. Pat. Nos. 5,276,622 and 4,821,849 illustrate prior art semi-active control systems. In many situations the tuning values applied to the system by the control routines are selected to control the suspended seat over an expected or typical range of inputs, rider weights, etc. These selected tuning values are unique for each system and are selected based on the particular damper design, installation kinematics, and control system being used. In this way known semi-active systems have attempted to provide the appropriate magnitude of damping forces in response to typical inputs to limit endstop collisions. Because known semi-active systems are tuned for typical system inputs, when very large inputs outside the typical input range are encountered, the large inputs can still produce endstop collisions.

It is not practical to use prior art systems and methods to tune a control system so that the system is able to sufficiently damp the complete range of possible inputs to the seat suspension. A system tuned for the complete range of system inputs would be very heavy and expensive and would likely not meet the space, weight and cost restrictions for the suspension. Additionally, tuning a system for the complete range of possible inputs including large inputs would degrade the ride over the routine or typical inputs. Finally, when endstop collisions occur, the collisions typically are unabated in known prior art systems, and as a result, the suspension system may experience one or more additional endstop collisions. Such endstop collisions are referred to by those skilled in the art as rebounds.

Frequently, seat riders set their leveled seat height at an extremely high or low position proximate the respective upper or lower mechanical seat endstops. When the seat is set proximate the upper and lower endstops and an input is experienced, the system does not have sufficient time and distance to apply sufficient damping force to prevent endstop collisions. As a result, unintended and undesirable impacts with the mechanical endstops occur. Because the seat is proximate the mechanical endstops, the unintended and undesirable collisions occur even when a typical input is applied to the system.

The foregoing illustrates limitations known to exist in present semi-active devices and methods. Thus, it is apparent that it would be advantageous to provide an alternative directed to providing a large damping force in response to a non-typically large input and also provides the best overall ride quality and protection of the rider when the leveled seat height exceeds normal bounds. Accordingly, a suitable alternative is provided including features more fully disclosed hereinafter.

SUMMARY OF THE INVENTION

This is accomplished by the present invention which generally relates to a method for limiting endstop collisions in semi-active seat suspension systems, and more particularly the invention relates to a method for limiting endstop collisions by adjusting the damping gain factor when either the system exceeds an endstop detection threshold or the seat is leveled outside of normal leveling limits. Generally the seat suspension includes a first endstop limit, a second endstop limit and means for controlling the seat displacement, and the method for limiting endstop collisions comprises the steps of: sensing the position of the seat; determining the seat velocity; calculating a control signal by multiplying the seat velocity by a gain factor; and transmitting the control signal to said displacement control means to increase the damping to the required level.

More specifically in one aspect of the present invention, endstop collisions are limited by providing a temporary or transient control method referred to as rebound control which causes a large damping force to be applied by the seat suspension system in response to non-typically large inputs which cause the seat to cross or exceed an endstop detection threshold.

In another specific aspect of the invention, this is accomplished by providing a level control algorithm that provides additional level control when the seat is leveled outside the normal leveling zone. The degree of additional level control or gain factor supplied is a function of the distance the seat exceeds the normal leveling zone. In this aspect of the present invention, rider protection from end stop collisions is maximized.

The foregoing and other aspects will become apparent from the following detailed description of the invention when considered in conjunction with the accompanying drawing figures.

BRIEF DESCRIPTION OF THE DRAWING FIGURES

FIGS. 1a, 1b, and 1c are schematic representations of a seat suspension system that utilizes the semi-active control system of the present invention to limit endstop collisions.

DETAILED DESCRIPTION

Figure 1A:
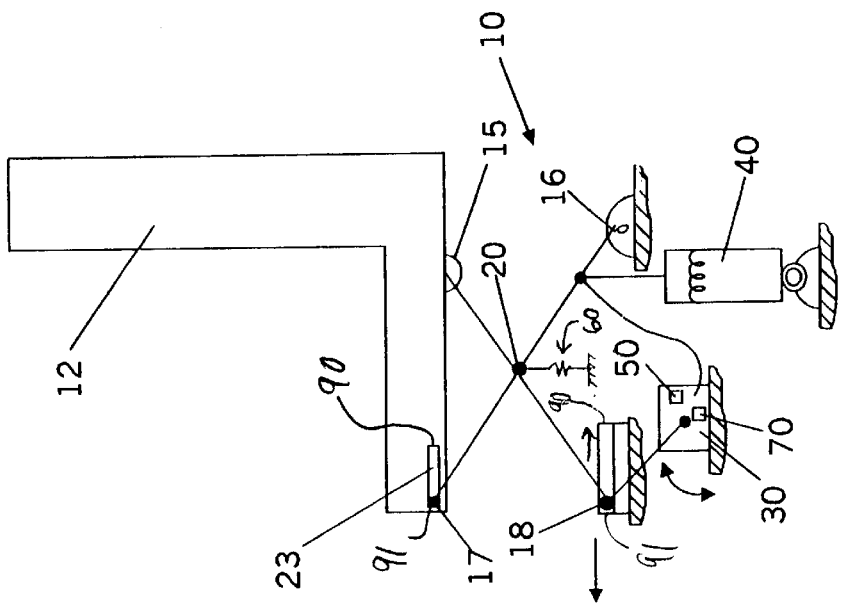
Figure 1B:
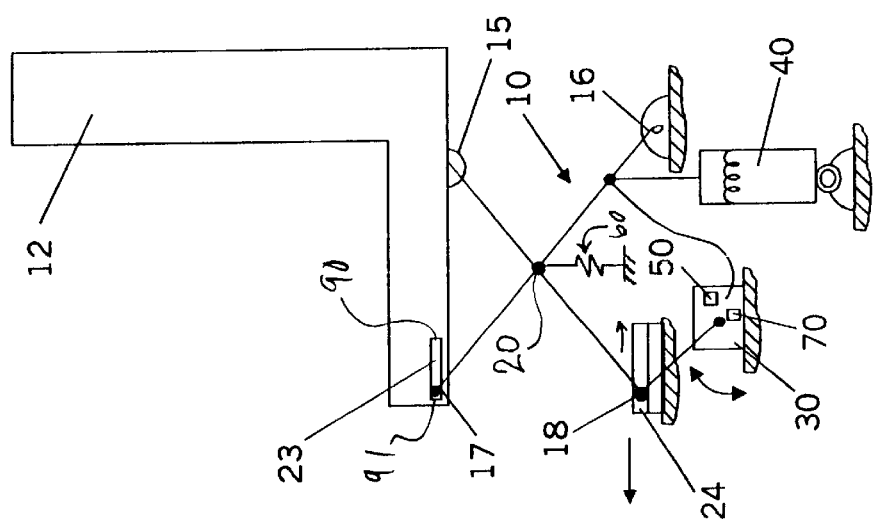
Figure 1C:
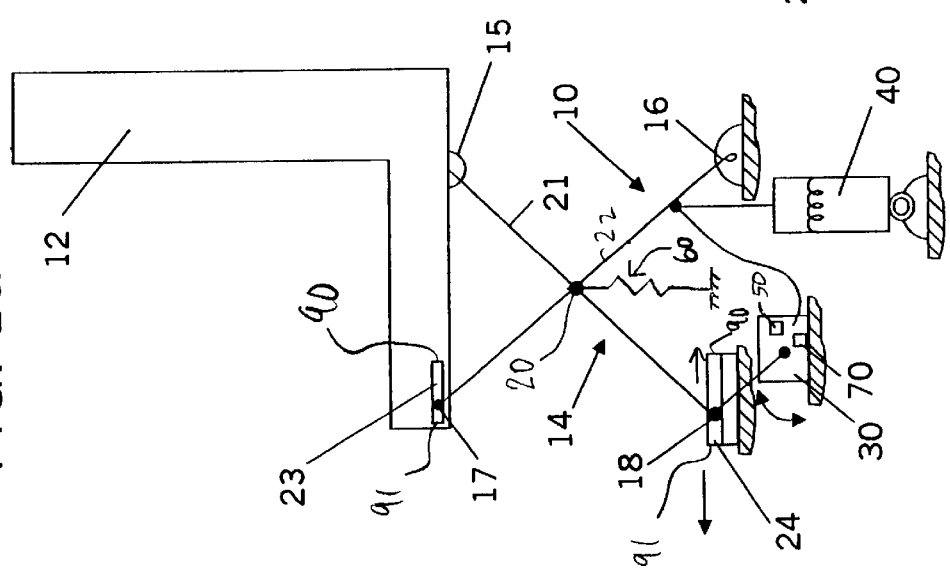

Now turning to the drawings wherein like parts are referred to by the same numbers in the several views, the present invention method most generally relates to a method for limiting endstop collisions in semi-active seat suspensions and the method is represented generally in FIGS. 2–6. As referred to hereinafter the term endstop shall refer to the end of permissible seat displacement. FIGS. 1a, 1b and 1c schematically illustrate a typical seat suspension system adapted for use in combination with the control method of the present invention where the seat is shown at different heights. The present invention, senses the seat position relative to the maximum and minimum endstop limits for suspension system 10 which supports seat 12 which might be a truck seat for example, and if the system approaches the endstop either when the seat is at an extreme leveled height or after an endstop collision has occurred, the gain supplied to the system is adjusted to rapidly increase the damping supplied by unit 40. The method of the present invention serves to greatly decrease travel to the endstop limits and thereby provides a more comfortable ride to the driver or passenger occupying seat 12.

The seat 12 includes a mechanical multibar linkage 14 with first and second links 21 and 22 shown in FIGS. 1a–c. The linkage is shown in FIGS. 1a–c is shown in two-dimensions for illustrative purpose, and it should be understood that the linkage includes additional members not shown in the Figures. The linkage 14 is exemplary and it should also be understood that the linkage may be comprised of any suitable means for movably joining the seat and suspension system. The links 21 and 22 include respective fixed location ends 15 and 16 typically rotatably fixed at the back of the seat, and linearly moveable ends 17 and 18 at the front of the seat. See FIGS. 1a–1c. The linearly movable ends of links move in a fixed linear path or track 23 and 24 and the rotatable ends 15 and 16 are fixed by a conventional connection that permits the ends 15 and 16 to be rotatable displaced. A pivotal connection 20 joins the links 21 and 22 and other members (not shown) comprising the linkage 14. The mechanical linkage is of conventional design well known to one skilled in the art and therefore further description of the linkage is not required.

A spring 60 is conventionally coupled to the mechanical linkage 14 at a suitable location and the spring serves to adjust the leveled height of the seat. The spring may be any suitable well known spring such as a mechanical coil spring or an air spring. The leveled seat height is the height that the seat assumes when it is unaffected or substantially unaffected by vibratory disturbances. The leveled seat height is selected by the rider for comfort, ease of reaching vehicle controls such as the steering wheel, brake, clutch and throttle pedal and also personal preference dictates the ultimate leveled seat height. The leveled height is controlled by increasing or decreasing the force supplied by spring 60 by respectively decreasing or increasing the spring height. The change in height may be effected in a number of ways such as by mechanically adjusting the coil spring endpoints or by releasing air from or introducing air into the air spring.

A conventional position sensor 30 is connected to link 21 and serves to sense the position of the link 21, and the position sensor is electrically connected to controller 70 which in turn is connected to conventional magnetorheological (MR) damper 40. The damper 40 is connected to link 22. The damper 40 may contain any suitable field responsive material including magnetorheological (MR) fluid as indicated. The damper serves to control the displacement of the seat during operation. The electrical signals are supplied to the damper during system operation to provide damping sufficient to prevent the system from reaching the maximum and minimum endstop limits. The damper 40 may be comprised of any suitable controllable damper such as a servo valve controlled damper for example.

A conventional microprocessor based controller 70 for processing the sensor signals and actuating the method of the present invention may be located in the same control housing as sensor 30 as shown in FIGS. 1a, 1b, and 1c. The controller is electrically connected to the memory 50. However the controller and sensor may be discrete components that are not collocated in the same housing. The control method 200 operates using conventional microprocessor based technology well known to one skilled in the art and therefore further detailed description of the microprocessor technology is not required.

The damper 40 serves to control the displacement of the seat during operation. The electrical signals are supplied to the damper during system operation to provide damping sufficient to prevent the system from reaching the maximum and minimum endstop limits 90 and 91.

The control method 200 includes at least three subroutines: main ride control algorithm 500, rebound control algorithm 300 and level control algorithm 400. The main seat or ride control routine 500 is not described in detail herein. See FIG. 4. The main ride control routine controls the seat during typical inputs and the present invention controls the seat damping when non-typical inputs or endstop collisions are experienced. The main ride control algorithm 500 may be comprised of the control method described in U.S. Pat. No. 5,276,622 for "System for Reducing Suspension End-Stop Collisions" or U.S. Pat. No. 4,821,849 for "Control Method and Means for Vibration Attenuating Damper" which control a seat suspension system when it experiences typical inputs.

Figure 4:
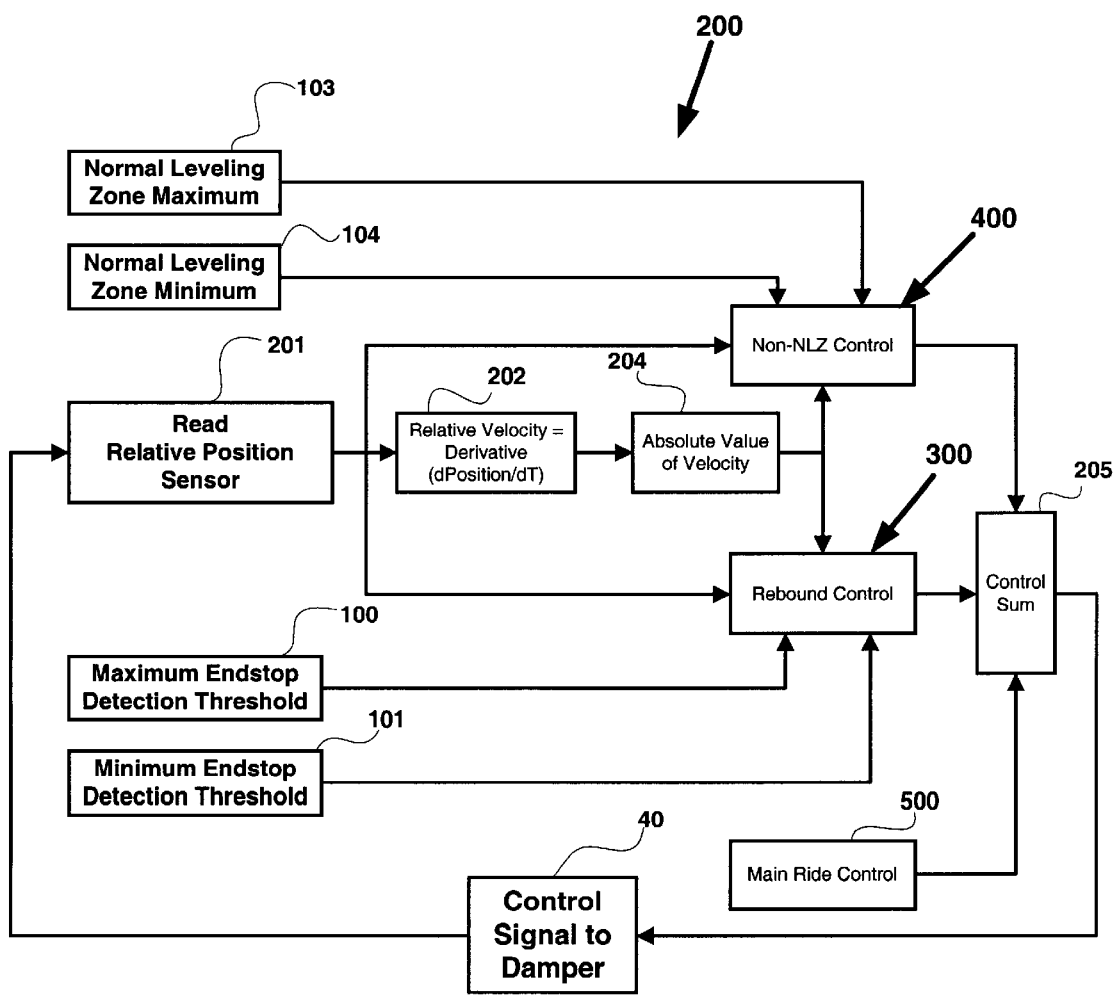
FIG. 4 is a schematic representation of a main control algorithm that includes the rebound control and leveled seat height control algorithms of the present invention.

FIG. 4 schematically illustrates the control algorithm of the present invention 200 for limiting endstop collisions in semi-active seat suspension system. As indicated above, in addition to main control routine 500, the algorithm 200 comprises a rebound control algorithm 300 and level control algorithm 400 and algorithms 300 and 400 are graphically illustrated in FIGS. 5 and 6 respectively. As the algorithm 200 is executed both algorithms are continuously and rapidly executed. Sensor 30 continuously monitors the leveled seat height and also the proximity of the seat to maximum and minimum endstop detection thresholds 100 and 101 to determine the branches or sections of algorithms 300 or 400 to be executed to limit endstop collisions.

In algorithm 200 the position sensor 30 continuously monitors the change in position of link 21 over time. See Step 201. The change in position of link 21 over time represents the relative velocity of the seat 12. See Step 202. In Step 203, the leveled seat height is sensed by sensor 30. The sensed relative seat position and relative seat velocity are provided to algorithms 300 and 400 when they are executed. Additionally, the values for maximum seat position and minimum seat position are supplied to the controller and are used to calculate the distance to the end stop limit 90 or 91. In Step 204, the algorithm 200 determines if the seat is within the predetermined normal leveling zone (hereinafter "NLZ") for the particular seat model and manufacturer. When the leveled seat height is outside the normal leveling zone or NLZ, the level of damping applied to the seat is increased pursuant to the logic of level control routine 400. When it is determined that the seat has traveled past either a maximum or minimum endstop detection threshold 100 or 101, the level of damping applied to the seat is increased pursuant to the logic of rebound control routine 300.

Figure 5:
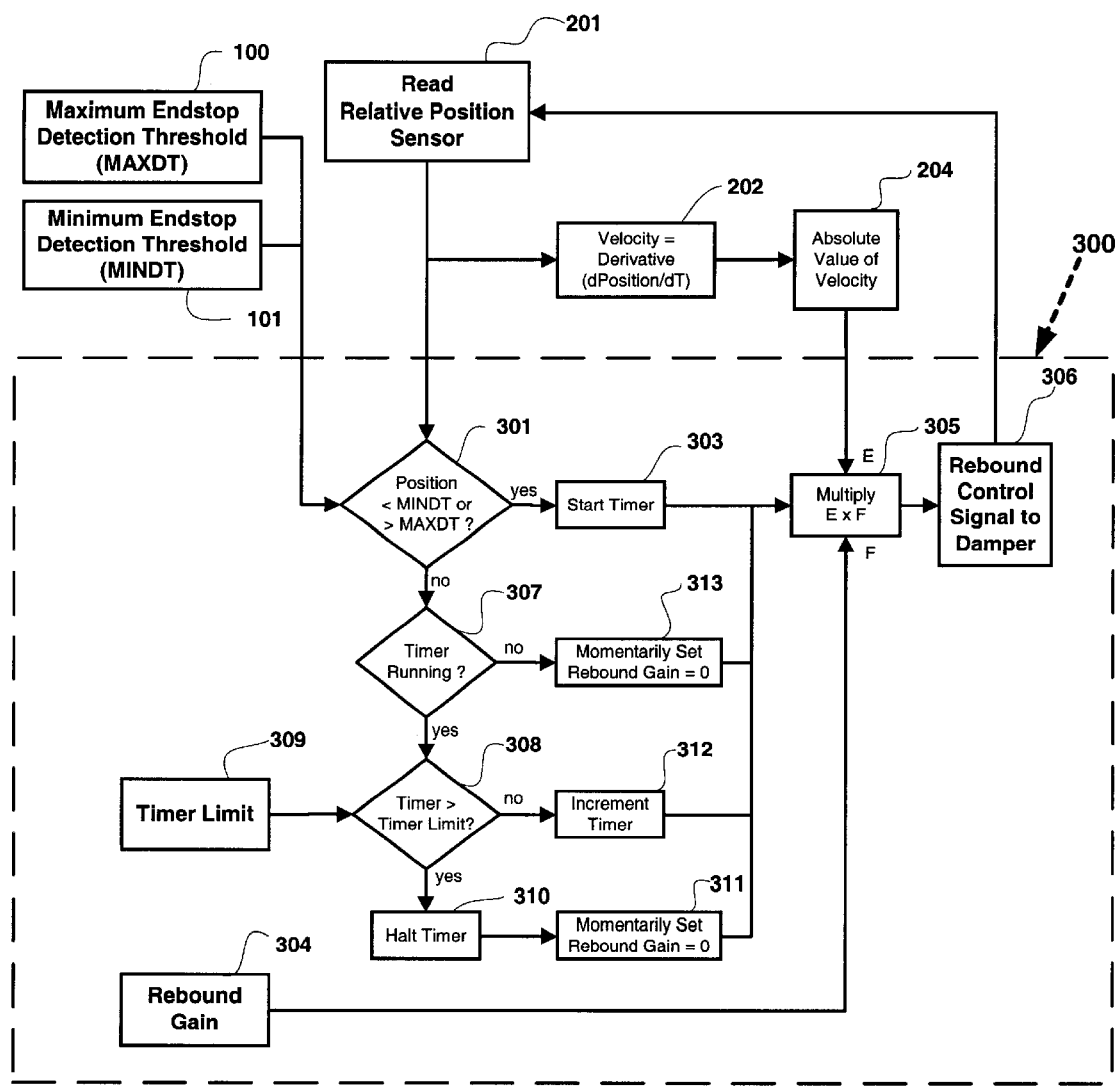
FIG. 5 is a schematic representation of the rebound control algorithm of the present invention.

Turning to the rebound control routine 300 shown in FIG. 5, in Step 301 the seat position is compared to the minimum and maximum detection thresholds 100 and 101 and if the seat position exceeds either threshold limit the gain applied to the damper control signal is significantly increased to rapidly increase damping supplied by damper 40 and thereby prevent residual endstop collisions. As the description proceeds the terms minimum detection threshold and maximum detection threshold may also be referred to in abbreviated form respectively as MINDT and MAXDT.

Figure 3:
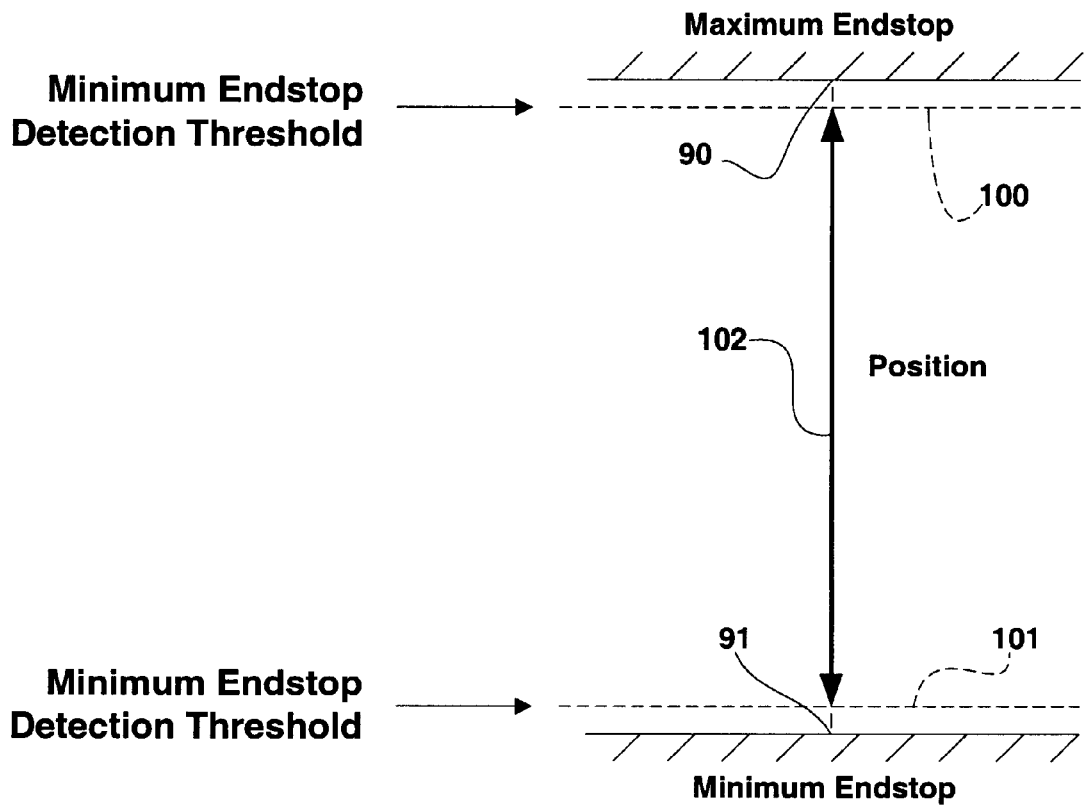
FIG. 3 is a schematic representation of the seat displacement including the maximum and minimum endstop detection threshold levels.

FIG. 3 schematically illustrates the range of displacement for suspension system 10 as well as the approximate locations of the maximum and minimum endstop detection thresholds 100 and 101 relative to respective maximum and minimum endstops 90 and 91. Also see FIGS. 1a, 1b and 1c which identify endstop positions 90 and 91. The rebound control routine 300 increases the gain supplied to the damper control signal when the seat suspension experiences non-typical disturbances that cause the seat to move past either threshold 100 or 101 and such non-typical disturbances may even produce endstop collisions. The routine 300 does not effect the gain applied to the damper control signal when the seat position is located between the threshold boundaries along position 102. It should be understood that although the endstops 90 and 91 are shown oriented vertically relative to each other in FIG. 3, the endstops may be oriented relatively horizontally as shown in FIGS. 1a, 1b and 1c.

Again turning to rebound control algorithm 300, the absolute value of the velocity calculated in Step 202 is taken in Step 302. If in Step 301 it is determined that the leveled seat height is either less than the minimum endstop detection threshold (MINDT) 101 or the leveled seat height is greater than the maximum endstop detection threshold (MAXDT) 100, the timer is started in Step 303 and then in Step 305 the absolute value of the velocity calculated in Step 302 is multiplied by a predetermined gain factor stored in memory 50. The gain constant may be a factor of two or three. The predetermined gain factor is the multiplication factor that has been determined as the suitable value for the particular seat suspension in use. By maximizing the multiplied gain factor residual endstop collisions, are prevented. In Step 304 the rebound gain factor is obtained from memory 50, and in Step 305 the product of the absolute value of the seat velocity (identified as E in Step 305) is multiplied by the gain factor (identified as F in Step 305). The product obtained in Step 305 represents the rebound control signal required to limit endstop collisions and in Step 306 the rebound control signal is sent to damper 40 to control the motion of seat 12. The routine 300 then returns to Step 201 to again determine the position of the seat. Ultimately, the damping forces applied during a non-typical input event may be two or three times greater than the damping forces applied during typical input events. If after the rebound control signal is sent to the damper the seat still has exceeded the MINDT or MAXDT values, the timer is again restated in Step 303 and Steps 305 and 306 are executed as previously described.

The product calculated in Step 305 is one component of the control signal that is ultimately transmitted to damper 40. The rebound control signal calculated in Step 305 is added with other component control signals in the control sum Step 205 of algorithm 200 to arrive at a control signal value. For example, the control signal of Step 306 may be summed with component signals received from main ride routine 500 and the level control routine 400 described hereinbelow. The summed rebound control signal of Step 205 is applied to damper 40 as the damper control signal.

If in Step 301 it is determined that the seat position has not exceeded either of the detection thresholds 100 or 101, the algorithm will not apply the gain factor to the rebound control signal. The gain factor is momentarily set equal to zero. If the MINDT and MAXDT values have not been exceeded and the routine timer is running in Step 307, the routine 300 compares the actual timer value to the predetermined timer limit retrieved from memory 50 in Step 309. If the actual time has exceeded the timer limit, (usually about one second) then the timer is stopped in Step 310 and the gain factor is momentarily set to zero. In Step 307 if the timer is not running the gain factor is momentarily set to zero in Step 313. When Steps 313 and 311 are executed the product in Step 305 will be zero so that the rebound control algorithm component summed in Step 205 will also be zero.

If in Step 308 the timer has not exceeded its predetermined limit, the timer is incremented in Step 312 and the routine proceeds to the production of the rebound control signal in Step 305 as previously described hereinabove.

Although the rebound control routine 300 of the present invention is shown and described as controlling the gain factor when the seat exceeds either the maximum or minimum threshold detection limits it should be understood that the system may only effect the gain when one of the endstop detection thresholds is exceeded plus a finite time interval. For example the gain may only need to be considered when the minimum endstop detection threshold is exceeded. In such a situation the seat occupant's weight in combination with the stored energy of the compressed spring will force the seat back towards the opposite endstop thus requiring a significant increase in the supplied damping to prevent a collision with endstop 90. Conversely when the seat is at the height of its travel, the spring 60 is fully extended and has no stored energy making is less critical to significantly increase damping supplied by damper 40.

Figure 6:
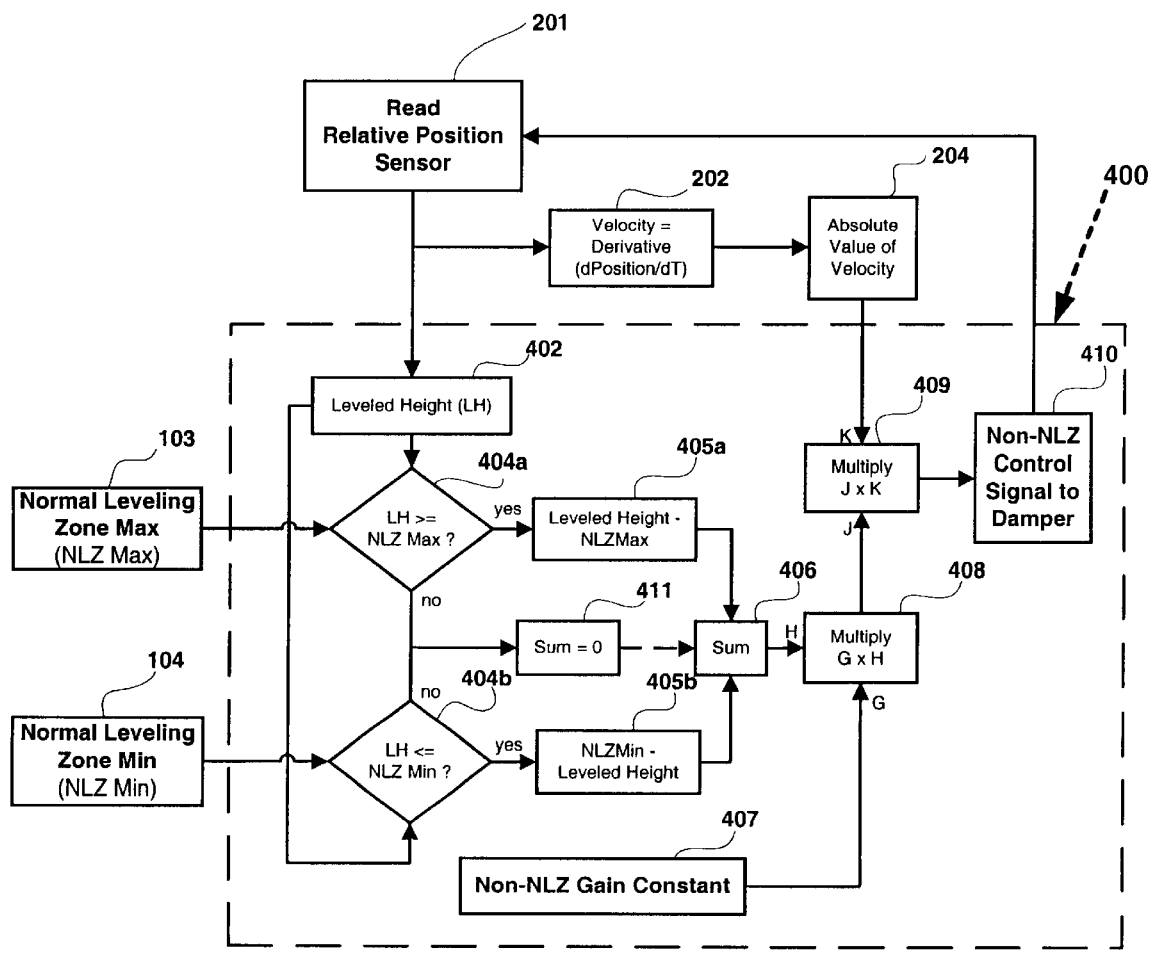
FIG. 6 is a schematic representation of the level control algorithm of the present invention.

Now turning to the level control algorithm 400 shown schematically in FIG. 6, the level control algorithm serves to prevent endstop collisions when the seat is leveled at a position that is outside a predetermined normal leveling zone or NLZ for the particular seat in use. In Steps 204a and 204b the routine 400 determines if the seat has been leveled at a height that is outside of the normal leveling zone NLZ identified as 113 in FIG. 3.

The seat position sensed by sensor 30 in Step 201 is sent to the controller and in Step 202 the derivative of the position or the change in position per unit time. The absolute value of the velocity calculated in Step 202 is taken in Step 403.

Figure 2:
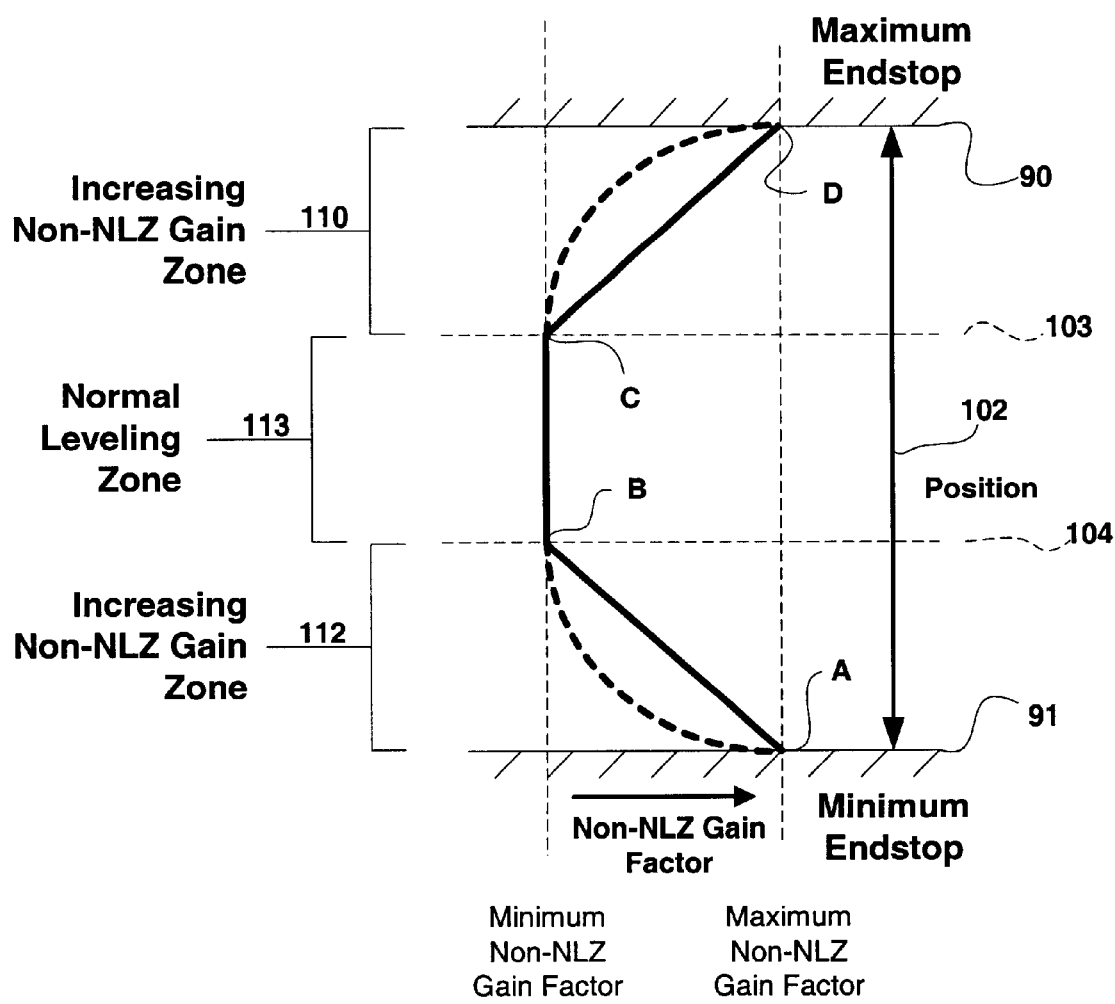
FIG. 2 is a graphical representation of the changes in the gain when the seat is located outside of the normal leveling zone.

In Step 402, the leveled seat height is computed using a suitably tuned low pass filter of conventional design is compared with the normal leveling zone maximum limit 103 and the normal leveling zone minimum limit 104 in respective Steps 404a and 404b. See FIG. 6. The maximum and minimum limits are shown in FIG. 2. If in Step 404a it is determined that the leveled seat height is in zone 110 and is therefore above limit 103 and the NLZ as shown in FIG. 2, Step 405a determines where in the zone 110 the leveled seat height is located. If in Step 404b it is determined that the leveled seat height is in zone 112 and is therefore below limit 104 and below the NLZ, Step 405b determines where in the zone 112 the leveled seat height is located. In respective Steps 405a and 405b the difference between the leveled height and the above normal minimum and the below normal maximum values are taken. The difference calculated in Step 405a and 405b is summed in Step 406 with other calculated values. If in Steps 404a or 404b it is determined that the leveled height is within the NLZ, the sum is set equal to zero in Step 411.

In Step 407 the non-NLZ gain is read from memory 50. The stored gain is a predetermined constant value for the particular seat in use. In Step 408 the non-NLZ gain is multiplied by the value of the deviation from the NLZ to arrive at the gain factor. As shown in FIG. 2, the gain factor calculated in Step 408 increases as the seat approaches the endstop limit once the seat enters either the above normal leveling zone 110 (above point C) or the below normal leveling zone 112 (below point B). The value of the gain factor is constant in the NLZ, between points B and C, in FIG. 2. The gain factor is at a maximum value at the endstops 90 and 91 also identified as points A and D in FIG. 2. The gain factor increases substantially linearly in zones 110 and 112 between points C and D and B and A respectively.

FIG. 2 illustrates a linearly increasing gain factor as the leveled seat height is at increasing distances from the NLZ maximum limit or is at decreasing distance from the NLZ minimum limit. It should be noted that any non-linear function, such as a squared relationship could be implemented to increase the gain factor. An example of a non-linear function is represented in dashed font in FIG. 2.

By maximizing the gain factor at the endstop collision, the tendency for a rebound collision with the opposite endstop will be minimized. Turning to FIG. 6, in Step 408 the non-NLZ gain constant (identified as G in Step 407) is multiplied with the sum arrived at in Step 406 (identified as H in Step 406) and this product (identified as J in Step 408) is the gain factor. The gain factor is in turn multiplied with the absolute value of the relative seat velocity (identified as K in Step 403) to arrive at the non-normal leveling zone control signal that is transmitted to damper 40. The signal of Step 410 is summed in Step 205 as previously described.

By algorithm 400 when a seat is leveled outside a predefined normal leveling zone for the seat, the algorithm will adjust the applied gain factor according to the relationship of FIG. 2 so that endstop collisions that are a result of leveling the seat proximate the endstops will be limited. In this way, the increased damping force is a preventative measure for limiting endstop collisions While I have illustrated and described a preferred embodiment of my invention, it should be understood that this is capable of modification, and I therefore do not wish to be limited to the precise details set forth, but desire to avail myself of such changes and alterations as fall within the purview of the following claims.

I claim:

1. In a seat suspension system having a first endstop limit, a second endstop limit and means for controlling the seat displacement, a method for limiting endstop collisions, the method comprising the steps of:
   (a) sensing the relative position of the seat;
   (b) determining the relative seat velocity;
   (c) calculating a control signal by multiplying the seat velocity by a gain factor; and
   (d) transmitting the control signal to said displacement control means to increase the damping to the required level.

2. The method of claim 1 further comprising the step of calculating the relative change in position of the seat per unit time in step (b).

3. The method of claim 1 wherein in step (b) the method further comprising the steps of calculating the relative change in position of the seat per unit time and taking the absolute value of the relative change in seat position per unit time.

4. The method of claim 1 wherein the gain factor is a fixed value.

5. The method of claim 1 wherein the gain factor is comprised of a constant value multiplied by the deviation of the seat from a normal leveling zone.

6. The method of claim 5 wherein the gain factor is of the greatest magnitude when the seat is proximate one of the endstop limits.

7. The method as claimed in claim 1 wherein before step (c) the method comprising the additional steps of determining the leveled seat height; determining if the leveled seat height is within or outside of a normal leveling zone.

8. The method as claimed in claim 7 wherein the method comprises the steps of determining if the leveled seat height is greater than the maximum normal leveling zone limit and determining if the leveled seat height is less than the minimum normal leveling zone limit.

9. The method as claimed in claim 8 wherein if the leveled seat height is greater than the maximum normal leveling zone limit, the method comprising the additional step of subtracting the value of the normal leveling zone maximum limit from the value of the leveled seat height.

10. The method as claimed in claim 8 wherein if the leveled seat height is less than the minimum normal leveling zone limit, the method comprising the additional step of subtracting the value of the leveled seat height from normal leveling zone minimum limit.

11. The method of claim 5 comprising the step of multiplying the difference of claim 9 by the gain constant.

12. The method as claimed in claim 5 comprising the step of multiplying the difference of claim 10 by the gain constant.

13. The method of claim 6 wherein the gain factor varies linearly from a maximum normal leveling zone limit to the first endstop.

14. The method of claim 6 wherein the gain factor varies linearly from a minimum normal leveling zone limit to the second endstop.

15. The method as claimed in claim 6 wherein the gain factor is a function of the distance the seat is outside the normal leveling zone.

16. The method as claimed in claim 1 wherein before step (c) the method comprising the additional step of determining if the seat position is less than a minimum endstop detection threshold.

17. The method as claimed in claim 1 wherein before step (c) the method comprising the additional step of determining if the seat position is greater than the maximum endstop detection threshold.

18. The method as claimed in claim 16 wherein the system includes a timer, the method comprising the additional step of starting the timer if the seat position is less than a minimum endstop detection threshold.

19. The method as claimed in claim 17 wherein the system includes a timer, the method comprising the additional step of starting the timer if the seat position is greater than the maximum endstop detection threshold.

20. The method as claimed in claim 18 wherein the gain factor is set to zero if the timer is not running.

21. The method as claimed in claim 18 wherein if the timer limit is exceeded the timer is halted and the gain factor is set to zero.

22. The method as claimed in claim 7 wherein a sum value is set equal to zero if the leveled seat height is within the normal leveling zone.

23. The method as claimed in claim 18 wherein if the timer has not exceeded a timer limit, the timer is incremented.

24. In a seat suspension system having a first endstop limit, a second endstop limit and means for controlling the seat displacement, a method for limiting endstop collisions, the method comprising the steps of:

(a) sensing the position of the seat and calculating the deviation of the sensed seat position from a predetermined normal leveling zone;
  (b) determining the relative seat velocity;
  (c) calculating a control signal by multiplying the relative seat velocity by a gain factor, where the gain factor is comprised of a constant value multiplied by the deviation from a predefined normal leveling zone; and
  (d) transmitting the control signal to said displacement control means to increase the damping to the required level.

25. In a seat suspension system having a first endstop limit, a second endstop limit and means for controlling the seat displacement, a method for limiting endstop collisions, the method comprising the steps of:

(a) calculating the deviation of the sensed seat position from a predetermined normal leveling zone;
  (b) determining the relative seat velocity;
  (c) calculating a control signal by multiplying the relative seat velocity by a gain factor, where the gain factor is comprised of a constant value multiplied by the deviation from a predefined normal leveling zone; and
  (e) transmitting the control signal to said displacement control means to increase the damping to the required level.

26. In a seat suspension system having a seat with a leveled seat height, a first endstop limit, a second endstop limit and means for controlling the seat displacement, a method for limiting endstop collisions, the method comprising the steps of:

(a) calculating the deviation of the sensed seat position from a predetermined normal leveling zone maximum and minimum limits, if the leveled seat height is greater than the predetermined maximum normal leveling zone limit, the method comprising the additional step of subtracting the value of the normal leveling zone maximum limit from the value of the leveled seat height; and if the leveled seat height is less than the minimum normal leveling zone limit, the method comprising the additional step of subtracting the value of the leveled seat height from normal leveling zone minimum limit;
  (b) determining the relative seat velocity;
  (c) calculating a control signal by multiplying the relative seat velocity by a gain factor, where the gain factor is comprised of a constant value multiplied by the deviation from a predefined normal leveling zone; and
  (d) transmitting the control signal to said displacement control means to increase the damping to the required level.

* * * * *